Feb. 9, 1932.  J. V. GIESLER ET AL  1,844,469
METHOD OF MAKING TUBULAR METALLIC BELLOWS
Filed July 18, 1928
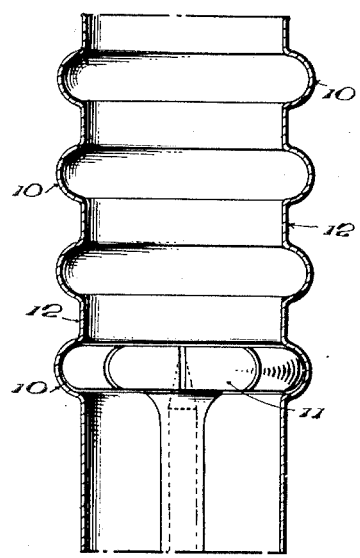
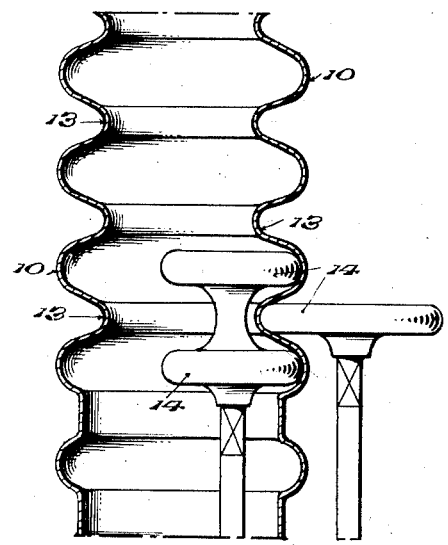
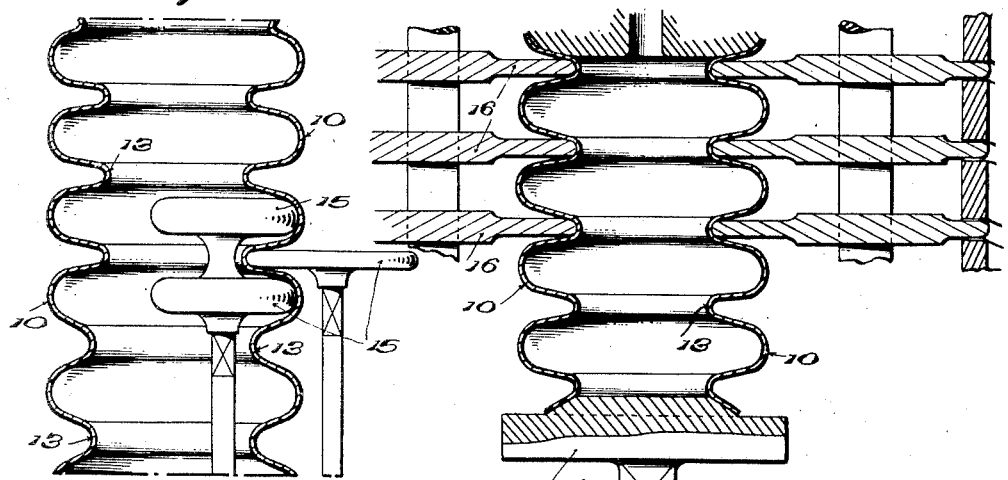
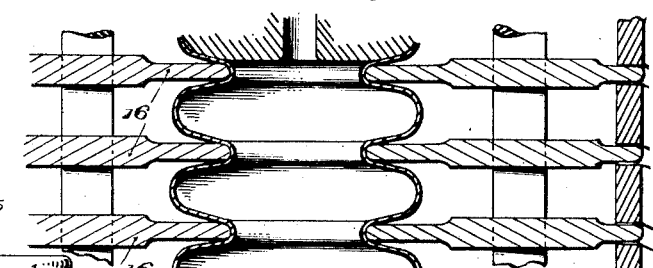
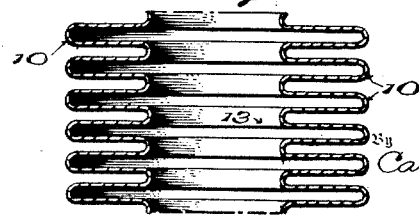

Patented Feb. 9, 1932

1,844,469

UNITED STATES PATENT OFFICE

JEAN V. GIESLER, OF KNOXVILLE, TENNESSEE, AND FRED K. BEZZENBERGER, OF CLEVELAND, OHIO, ASSIGNORS TO THE FULTON SYLPHON COMPANY, OF KNOXVILLE, TENNESSEE, A CORPORATION OF DELAWARE

METHOD OF MAKING TUBULAR METALLIC BELLOWS

Application filed July 18, 1928. Serial No. 293,782.

This invention relates to the manufacture of tubular metallic bellows, and more particularly to a method of making such bellows involving the use of hydrostatic pressure.

Tubular metallic bellows have heretofore been manufactured by various processes, as by rolling or spinning operations and by expanding under hydraulic pressure. As an example of mechanical methods for manufacturing tubular bellows see the patent to Fulton, No. 971,838, October 4, 1910; as examples of hydraulic methods see the patents to Bezzenberger, No. 1,506,966, September 2, 1924, and Fulton, et al., No. 1,522,051, January 6, 1925; and as examples of methods embodying both mechanical and hydraulic operations see in addition to Fulton, et al. just cited, the patent to Fay, No. 1,644,823, October 11, 1927.

It has been found in the manufacture of flexible metallic bellows capable of withstanding a great number of flexures without rupture that care must be exercised to avoid overworking the metal in the zones of greatest deformation, and at the same time to provide the proper amount of temper or elasticity in all parts of the bellows adapted to be stressed by flexure.

Methods of expanding metallic tubes into corrugated dies by hydraulic pressure, as shown in the patents to Fulton, et al., No. 1,522,051 and Bezzenberger, No. 1,506,966, have the advantage that they test the bellows for hidden flaws and defects. Since the pressures of formation are much higher than the operating pressures to which the bellows will be subjected in use, it is evident that defects which would cause failure of the bellows in use will be discovered during manufacture. However, when the corrugations are completely formed by hydraulic expansion of thin-walled tubes, the inner bends of the bellows may not be sufficiently worked to produce the desired strain hardness and elasticity, while excessive tube losses may result from overthinning or bursting of the tubes under the pressure employed. If rolling operations are employed to impart the desired strain hardness and elasticity to the completed bellows great care must be exercised to avoid excessive tube losses by reason of the roll cutting arising from the use of relatively thin rolls in the finishing operations.

It is an object of this invention to provide a new and improved method for the manufacture of flexible metallic bellows employing hydraulic pressure, in which over-straining and thinning of the metallic wall is avoided.

Another object of the invention is the provision of such a method in which the bellows is subjected to cold working operations to impart the desired elasticity to the different parts thereof.

Another object is the provision of such a method in which the final shaping of the bellows is accomplished by hydraulic pressure, thus avoiding loss through roll cutting by sharp-edged finishing rolls.

Another object is the provision of such a method in which the final shaping of the bellows is accomplished by hydraulic pressure, while avoiding excessive tube losses because of excessive metal displacement under high pressure.

Another object is the provision of such a method which retains the advantages of hydraulic completion of the bellows, and at the same time obtains advantages of temper or elasticity distribution heretofore obtained only by rolling operations.

Other objects and advantages will be apparent to persons skilled in this art from the following description thereof.

While the method of this invention can be carried out by use of a wide variety of apparatus, suitable apparatus for performing the method has been diagrammatically indicated on the accompanying drawings, which also illustrate the several steps described.

In said drawings,

Fig. 1 is a diagrammatic view illustrating the formation of the initial outwardly directed corrugations;

Fig. 2 is a diagrammatic view illustrating the step of deforming inwardly the spaces between said initial corrugations;

Fig. 3 is a diagrammatic view illustrating the deepening of said inward corrugations;

Fig. 4 is a diagrammatic view illustrating the hydraulic step; and

Fig. 5 shows a section through a completed bellows.

According to the present invention, a thin-walled tube of the desired metallic composition, as brass, bronze, nickel, aluminum, or iron alloys, is selected having a diameter intermediate the inside and outside diameters of the bellows which it is desired to form. The exact relationship of these dimensions is controlled to some extent by the character of the metal, and by the contour of the corrugations to be formed, but is calculated to properly proportion the deformations in the wall necessary to form the inner and outer corrugations, and thus greatly reduce the maximum amount of deformation necessary.

The first step in the formation of the bellows is an expanding operation on axially spaced circumferential portions to form broad, shallow, outwardly-extending corrugations 10 as diagrammatically illustrated in Fig. 1. This operation may be performed in any suitable manner, as by means of an expanding mandrel 11 or by means of cooperating rolls such as shown for instance in the patent to Fulton, No. 971,838. The extent of this expanding operation is so calculated that the further deformation necessary to bring the outer corrugations to final form will, in itself, involve the proper amount of cold working of the wall to impart to the outer corrugations the desired elasticity and toughness for the finished bellows. If desired the tube may be annealed at this stage.

The second step of the process involves a contraction of the zones 12 of the tube intermediate the outward corrugations to form shallow inward corrugations 13 as diagrammatically illustrated in Fig. 2. This step may also be performed in any suitable manner, as by spinning or rolling, cooperating rolls 14 of the type shown in Fulton Patent No. 971,838, being diagrammatically indicated on the drawings, and is carried so far as to leave just sufficient work to be done thereon to impart the proper temper to the inward corrugations. The dimensions of the tube and the corrugations are so chosen with respect to the physical properties of the metal, that this operation is within the safe working limit of the metal. Obviously, this step of forming inwardly directed corrugations could be performed simultaneously with or subsequently to the forming of the first outwardly directed corrugations, as well understood in the art.

The tube is then annealed to remove the strain caused by the working and deformation of the wall, bringing the tube to a state of substantially uniform softness and ductility. The tube, thus rendered capable of further cold working, is then subjected to a second operation, as diagrammatically indicated in Fig. 3, in which the inward corrugations are deepened approximately to the finished inner diameter of the bellows. This operation is also performed in any suitable way, as by spinning or rolling, cooperating rolls 15 being diagrammatically indicated on the drawing, and is continued until the desired reduction in diameter is secured, but the inner bends are not necessarily brought to their final contour since that may be accomplished in the final step of formation of the bellows. It will thus be seen that the tools used need not be so narrow and sharp as would be necessary to finally form the bends, and therefore loss through roll cutting of the walls is reduced or eliminated.

The corrugated tubes so formed are then placed in suitable forming dies 16 diagrammatically indicated in Fig. 4, such as shown for instance in the patent to Bezzenberger, No. 1,506,966, and hydraulic pressure is applied to expand the walls between the dies. At the same time endwise pressure is preferably applied, as by a plunger 17, to cause the metal of the wall to flow towards the summits of the corrugations, and to collapse the corrugations to the final form diagrammatically illustrated in Fig. 5.

These finishing operations impart the proper temper to the metal to secure the necessary elasticity and toughness of the bellows, without danger of loss through roll cutting or excessive metal displacement. The hydraulic working of the bellows causes an even and general flowing of the metal, both in the bends and in the plane portions of the tube, so that the bellows is tempered to the proper degree in its different parts to withstand the repeated stresses during flexure when in operation. Furthermore, any flaws or weakened places in the wall will give way under the heavy hydraulic pressure so that imperfect tubes will be at once detected and discarded.

While one method of carrying out this invention has been described, for purposes of illustration, with considerable particularity, and suitable apparatus for performing the steps of the method have been indicated diagrammatically, it is to be understood that the inventive concept is capable of expression in a variety of ways, and the scope of the invention is not limited to the details of the disclosure, but is to be ascertained from the claims appended hereto.

What is claimed is:

1. The method of corrugating tubular walls which comprises forming spaced broad outward corrugations therein and contracting the intermediate portions to form inward corrugations, and then deepening and narrowing the outward corrugations by hydraulic pressure.

2. The method of corrugating tubular walls which comprises shaping the tube to form relatively broad shallow outwardly and inwardly extending corrugations, rolling the inwardly extending portions to form inward corrugations, and then shaping the outward corrugations by hydraulic pressure.

3. The method of corrugating tubular metallic walls which comprises forcing the metal of the tube outward to form broad corrugations therein with intermediate portions substantially of the diameter of the original tube, forcing the intermediate portions inwardly to form inward corrugations, and then expanding the outward corrugations to final form by hydraulic pressure.

4. The method of corrugating tubular walls which comprises forcing the metal of the wall outward to form spaced broad corrugations therein, rolling the intermediate portions into inward corrugations, then expanding the corrugations to final form by hydrostatic pressure.

5. The method of corrugating tubular walls which comprises forcing the metal of the wall outward to form spaced broad corrugations therein, rolling the intermediate portions into inward corrugations, and then expanding the outward corrugations to final form by hydraulic pressure while applying endwise compression thereto.

6. The method of corrugating tubular walls which comprises forcing the metal of the wall outward to form broad corrugations therein, mechanically working the intermediate portions to form inward corrugations, and then expanding the wall by hydrostatic pressure while preventing undue thinning of the metal at the bends by applying axial pressure thereto.

7. A method of making flexible corrugated tubes which comprises expanding spaced circumferential portions of the tube to form broad outward corrugations, contracting the intermediate portions to the final inner diameter of the tube, and then hydraulically expanding the outward corrugations to the final outer diameter of the tube.

8. A method of making flexible corrugated tubes which comprises expanding spaced circumferential portions of the tube to form broad outward corrugations, rolling the intermediate portions inward to approximately the final inner diameter of the tube, and then expanding the outward corrugations by hydraulic pressure to the final outer diameter of the tube.

9. A method of making flexible corrugated tubes which comprises expanding spaced circumferential portions of the tube to form broad outward corrugations, contracting the intermediate portions to approximately the final inner diameter of the tube, and then expanding the outward corrugations to final form by hydrostatic pressure while applying axial pressure thereto.

10. The process of making flexible corrugated metal tubes comprising forming a thin-walled metal tube having a diameter intermediate the inner and outer diameters of the corrugated tube, expanding spaced circumferential portions of the tube to form broad outward corrugations, contracting the intermediate portions to form shallow inward corrugations, annealing to remove strains in the metal, contracting the inward corrugations to approximately the final inner diameter of the tube, and then hydraulically expanding the outward corrugations to the final outer diameter of the tube.

11. The process of making flexible corrugated metal tubes comprising forming a thin-walled metal tube having a diameter intermediate the inner and outer diameters of the corrugated tube, expanding spaced circumferential portions of the tube to form broad outward corrugations, rolling the intermediate portions inward to form shallow corrugations, annealing to allow further working of the metal, rolling the inward corrugations to their final diameter, and then hydraulically expanding the outward corrugations to final form.

12. The process of making flexible corrugated metal tubes comprising forming a thin-walled metal tube having a diameter intermediate the inner and outer diameters of the corrugated tube, expanding spaced circumferential portions of the tube to form broad outward corrugations, rolling the intermediate portions inward to form shallow corrugations, annealing to allow further working of the metal, rolling the inward corrugations to their final diameter, and then hydraulically expanding the outward corrugations to final form while applying axial pressure thereto.

13. The method of corrugating tubular walls which comprises expanding spaced portions thereof into shallow corrugations, contracting the intermediate portions to a safe working limit for the metal, annealing to allow further working of the metal, contracting the inner corrugations to their final diameter, and hydraulically expanding the outward corrugations to final form, leaving the metal of the corrugations in elastic strain-hardened condition.

14. The method of corrugating tubular walls which comprises expanding spaced portions thereof into shallow corrugations, rolling the intermediate portions to a safe working limit for the metal, annealing to allow further working of the metal, rolling the inward corrugations to the final inner diameter of the tube, and expanding the corrugations into final form by hydraulic pressure.

15. The method of corrugating tubular walls which comprises expanding spaced portions thereof into shallow corrugations, contracting the intermediate portions inward to a safe working limit for the metal, annealing to allow further working of the metal, contracting the inward corrugations to the final inner diameter of the tube, and then expanding the corrugations by hydraulic pressure while applying endwise pressure to the tube.

In testimony whereof I have signed this specification.

JEAN V. GIESLER.

In testimony whereof I have signed this specification.

FRED K. BEZZENBERGER.